United States Patent
Glebe et al.

(10) Patent No.: US 11,249,968 B2
(45) Date of Patent: Feb. 15, 2022

(54) LARGE OBJECT CONTAINERS WITH SIZE CRITERIA FOR STORING MID-SIZED LARGE OBJECTS

(71) Applicant: SAP SE, Walldorf (DE)

(72) Inventors: Thorsten Glebe, Leimen (DE); Martin Heidel, Walldorf (DE); Michael Muehle, Walldorf (DE); Felix Knittel, Nußloch (DE); Reza Sherkat, Waterloo (CA)

(73) Assignee: SAP SE, Walldorf (DE)

( * ) Notice: Subject to any disclaimer, the term of this patent is extended or adjusted under 35 U.S.C. 154(b) by 392 days.

(21) Appl. No.: 15/150,301

(22) Filed: May 9, 2016

(65) Prior Publication Data

US 2017/0322960 A1 Nov. 9, 2017

(51) Int. Cl.
*G06F 16/22* (2019.01)
*G06F 3/06* (2006.01)

(52) U.S. Cl.
CPC .......... *G06F 16/2228* (2019.01); *G06F 3/064* (2013.01); *G06F 3/0608* (2013.01); *G06F 3/0674* (2013.01); *G06F 16/2219* (2019.01)

(58) Field of Classification Search
CPC ............. G06F 17/30321; G06F 3/0674; G06F 16/2228; G06F 16/2219; G06F 3/0608; G06F 3/064
USPC ........................................................ 707/741
See application file for complete search history.

(56) References Cited

U.S. PATENT DOCUMENTS

| | | | | |
|---|---|---|---|---|
| 5,504,887 | A | * | 4/1996 | Malhotra ................ G06F 16/35 |
| 5,687,343 | A | * | 11/1997 | Fecteau ............... G06F 12/0292 711/202 |
| 5,802,599 | A | * | 9/1998 | Cabrera ................ G06F 3/0611 711/100 |
| 5,951,680 | A | * | 9/1999 | Redlin ................. G06F 9/4488 713/1 |
| 6,065,013 | A | * | 5/2000 | Fuh ........................ G06F 16/289 |
| 6,104,394 | A | * | 8/2000 | Lisle ..................... G06F 3/0481 707/999.102 |
| 6,349,308 | B1 | * | 2/2002 | Whang ............... G06F 16/2246 |
| 6,456,305 | B1 | * | 9/2002 | Qureshi ............. G06F 16/9577 715/800 |
| 6,898,593 | B1 | * | 5/2005 | Mulukutla ........ G06F 16/24544 |
| 7,865,677 | B1 | * | 1/2011 | Duprey ................. G06F 3/0635 711/162 |
| 8,601,206 | B1 | * | 12/2013 | Shapiro ................. G06F 3/0688 711/105 |
| 8,880,835 | B2 | * | 11/2014 | Benhase ............... G06F 3/0688 711/170 |
| 9,208,200 | B1 | * | 12/2015 | Stone .................. G06F 16/2228 |
| 9,846,544 | B1 | * | 12/2017 | Bassov ................. G06F 3/0665 |

(Continued)

*Primary Examiner* — Ashish Thomas
*Assistant Examiner* — Nargis Sultana
(74) *Attorney, Agent, or Firm* — Mintz Levin Cohn Ferris Glovsky and Popeo, P.C.

(57) ABSTRACT

A method, computer program product and system are provided. The method, computer program product and system execute a process for storing an object in an object container that is stored in a persistency of a disk storage. The object container has size criteria whereby objects meeting the size criteria of the object container can be assigned to the object container. The object container can facilitate storing multiple objects to optimize disk storage usage by facilitating the assigning of multiple objects to the same disk storage page.

6 Claims, 6 Drawing Sheets

(56) References Cited

U.S. PATENT DOCUMENTS

| | | | | |
|---|---|---|---|---|
| 9,984,079 B1* | 5/2018 | Stickle | ............... | H04L 67/1097 |
| 10,133,666 B2* | 11/2018 | Wei | ............... | G06F 16/13 |
| 2003/0037060 A1* | 2/2003 | Kuehnel | ............... | G06F 12/08 |
| 2003/0065898 A1* | 4/2003 | Flamma | ............... | G06F 16/93 |
| | | | | 711/165 |
| 2005/0172271 A1* | 8/2005 | Spertus | ............... | G06F 11/3664 |
| | | | | 717/125 |
| 2006/0047670 A1* | 3/2006 | Yu | ............... | G06F 16/2219 |
| 2006/0075006 A1* | 4/2006 | Yu | ............... | G06F 16/2219 |
| 2006/0075007 A1* | 4/2006 | Anderson | ............... | G06F 3/0652 |
| 2006/0259728 A1* | 11/2006 | Chandrasekaran | ... | G06F 3/0685 |
| | | | | 711/170 |
| 2006/0271547 A1* | 11/2006 | Chen | ............... | G06F 16/1844 |
| 2007/0156763 A1* | 7/2007 | Liu | ............... | G06F 16/10 |
| 2008/0114780 A1* | 5/2008 | Man | ............... | G06F 16/2219 |
| 2008/0126737 A1* | 5/2008 | Hepkin | ............... | G06F 12/1027 |
| | | | | 711/171 |
| 2008/0263089 A1* | 10/2008 | Cousins | ............... | G06F 3/0689 |
| 2009/0112908 A1* | 4/2009 | Wintel | ............... | G06F 16/27 |
| 2009/0254643 A1* | 10/2009 | Terheggen | ............... | G06F 16/438 |
| | | | | 709/223 |
| 2010/0106930 A1* | 4/2010 | Foltz | ............... | G06F 12/1009 |
| | | | | 711/165 |
| 2010/0287346 A1* | 11/2010 | Schreter | ............... | G06F 12/023 |
| | | | | 711/162 |
| 2011/0138123 A1* | 6/2011 | Gurajada | ............... | G06F 16/284 |
| | | | | 711/118 |
| 2012/0072652 A1* | 3/2012 | Celis | ............... | G06F 12/0893 |
| | | | | 711/103 |
| 2013/0024616 A1* | 1/2013 | Kawaguchi | ............... | G06F 3/0605 |
| | | | | 711/114 |
| 2013/0103920 A1* | 4/2013 | Wei | ............... | G06F 16/13 |
| | | | | 711/173 |
| 2013/0132346 A1* | 5/2013 | Varadarajan | ............... | G06F 11/1448 |
| | | | | 707/639 |
| 2013/0204849 A1* | 8/2013 | Chacko | ............... | G06F 3/0641 |
| | | | | 707/692 |
| 2013/0275381 A1* | 10/2013 | De Schrijvr | ............... | G06F 16/27 |
| | | | | 707/652 |
| 2013/0290648 A1* | 10/2013 | Shao | ............... | G06F 3/0689 |
| | | | | 711/154 |
| 2013/0290665 A1* | 10/2013 | Heidel | ............... | G06F 16/2219 |
| | | | | 711/171 |
| 2013/0339567 A1* | 12/2013 | Carpentier | ............... | G06F 3/0607 |
| | | | | 711/4 |
| 2014/0026017 A1* | 1/2014 | Grube | ............... | G06F 16/182 |
| | | | | 714/770 |
| 2014/0188947 A1* | 7/2014 | Morris | ............... | G06F 16/25 |
| | | | | 707/812 |
| 2014/0279961 A1* | 9/2014 | Schreter | ............... | G06F 3/0673 |
| | | | | 707/693 |
| 2014/0281212 A1* | 9/2014 | Schreter | ............... | G06F 3/0611 |
| | | | | 711/112 |
| 2015/0074038 A1* | 3/2015 | Sarferaz | ............... | G06F 16/283 |
| | | | | 707/602 |
| 2015/0269203 A1* | 9/2015 | Baldwin | ............... | G06F 16/2228 |
| | | | | 707/741 |
| 2015/0293969 A1* | 10/2015 | Aakolk | ............... | G06Q 10/00 |
| | | | | 707/802 |
| 2015/0379053 A1* | 12/2015 | Bhattacharjee | ....... | G06F 16/245 |
| | | | | 707/722 |
| 2015/0379554 A1* | 12/2015 | Copeland | ............... | G06Q 30/0239 |
| | | | | 705/14.39 |
| 2016/0041698 A1* | 2/2016 | Tkach | ............... | G06F 3/0482 |
| | | | | 715/765 |
| 2016/0078045 A1* | 3/2016 | Ebsen | ............... | G06F 16/1744 |
| | | | | 707/693 |
| 2016/0132540 A1* | 5/2016 | Balasa Ramnath | ............... | G06F 16/2272 |
| | | | | 707/741 |
| 2016/0142484 A1* | 5/2016 | Shetty | ............... | G06F 9/44536 |
| | | | | 709/203 |
| 2016/0147819 A1* | 5/2016 | Schreter | ............... | G06F 16/214 |
| | | | | 707/701 |
| 2016/0210044 A1* | 7/2016 | Mitkar | ............... | G06F 3/0656 |
| 2017/0177476 A1* | 6/2017 | Goren | ............... | G06F 3/0673 |
| 2017/0228449 A1* | 8/2017 | Cui | ............... | G06F 16/221 |

* cited by examiner

LARGE OBJECT CONTAINERS WITH SIZE CRITERIA FOR STORING MID-SIZED LARGE OBJECTS

TECHNICAL FIELD

The subject matter described herein relates to database management, and more particularly to systems and methods for storing mid-sized large objects for use with in-memory database systems.

BACKGROUND

An in-memory database system is a database system that primarily uses main memory for data storage. One example of an in-memory database system is the HANA in-memory database system provided by SAP SE of Walldorf Germany. As opposed to employing a disk storage mechanism for storing business data, in-memory database systems such as HANA use main memory, which can be faster than disk-based databases. Accessing data in main memory reduces the input/output reading activity when querying the data, which in turn provides faster and more predictable performance than disk-based memory.

Some scenarios, however, result in in-memory data storage to be suboptimal. For example, a large object (LOB) can consume a large amount of memory space. The storage and processing of some large LOBs may slow down overall performance of the in-memory database system. For large LOBs that consist of a number of megabytes or even gigabytes of data, storing LOBs in main memory may not be appropriate since it might waste a lot of main memory. Especially if those LOBs are rarely accessed by the application.

It may also be beneficial to store LOBs, that are rarely accessed by the database management system, on disk-based memory instead of main memory. Disk-based memory can include a plurality of physical sectors. These sectors can have a common size and can denote a physical location on the disk. In the following we will refer to such sectors as 'pages'. Typically each object stored to disk-based memory needs its own physical address, i.e., its own page. Disk pages typically have certain sizes, for example, 4 kB, 16 KB, 1 MB, or the like. Pages having a common size allows a page management which avoids disk fragmentation. Where an object is smaller than the size of a page it means there is wasted space on the disk. For example, a page may have a size of 4 kilobytes but an object stored at that page may have a size of only 1 kilobyte, wasting 3 kilobytes of disk space. Typically, other objects cannot be stored at the same page because it would mean multiple objects having the same address without the ability to differentiate between those objects. Database management systems may manage the storage of many millions of objects that have a size smaller than one page. Consequently, there can be an enormous amount of wasted disk space.

SUMMARY

In one aspect, a method, computer program product and system are provided. The method, computer program product and system execute operations for determining which storage type to assign to a large object (LOB). In one variation, the operations can include determining a size of an object. The object can have raw data that is operable upon by one or more physical operators. The object can be stored individually in disk storage in response to a determination that the size of the object exceeds the size criteria of an object container. The object can be stored in main memory of an in-memory database in response to a determination that the size of the object is less than the minimum size criteria of an object container.

In some variations storing a LOB individually on disk means that the database creates a container consisting of a set of pages where the page sizes are chosen such that the waste on disk is minimal. For example a LOB object of 12 KB size will be stored in a database container consisting of three pages with a page size of 4 KB each (and not in a single page of 16 KB size, where we would have a disk waste of 4 KB). However in case the LOB size is below the minimal possible page size (in this example: 4 KB) it is not possible to have a smaller page size so storage on disk can be inefficient as disk waste is unavoidable.

In case the size a of a LOB object is such that the in-memory storage criteria is not fulfilled and the size of the LOB is so small that it is inefficient to store it as a single database container as the size is well below the minimal page size of the disk management system (example: LOB size is 1 KB and minimal page size is 4 KB, resulting in a waste of 3 KB), the LOB can be stored in an object container which can be configured to store multiple objects each having at least one common attribute. The object container can be stored in a persistency of a disk storage.

In some variations an identification can be assigned to the object. The identification of the object can be mapped to a page identification of the page to which the object has been saved in the persistency of a disk storage. The object container can be a page chain within the persistency of the disk storage.

The object can be accessed through an in-memory database system.

Implementations of the current subject matter can include, but are not limited to, systems and methods consistent with the present description, including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
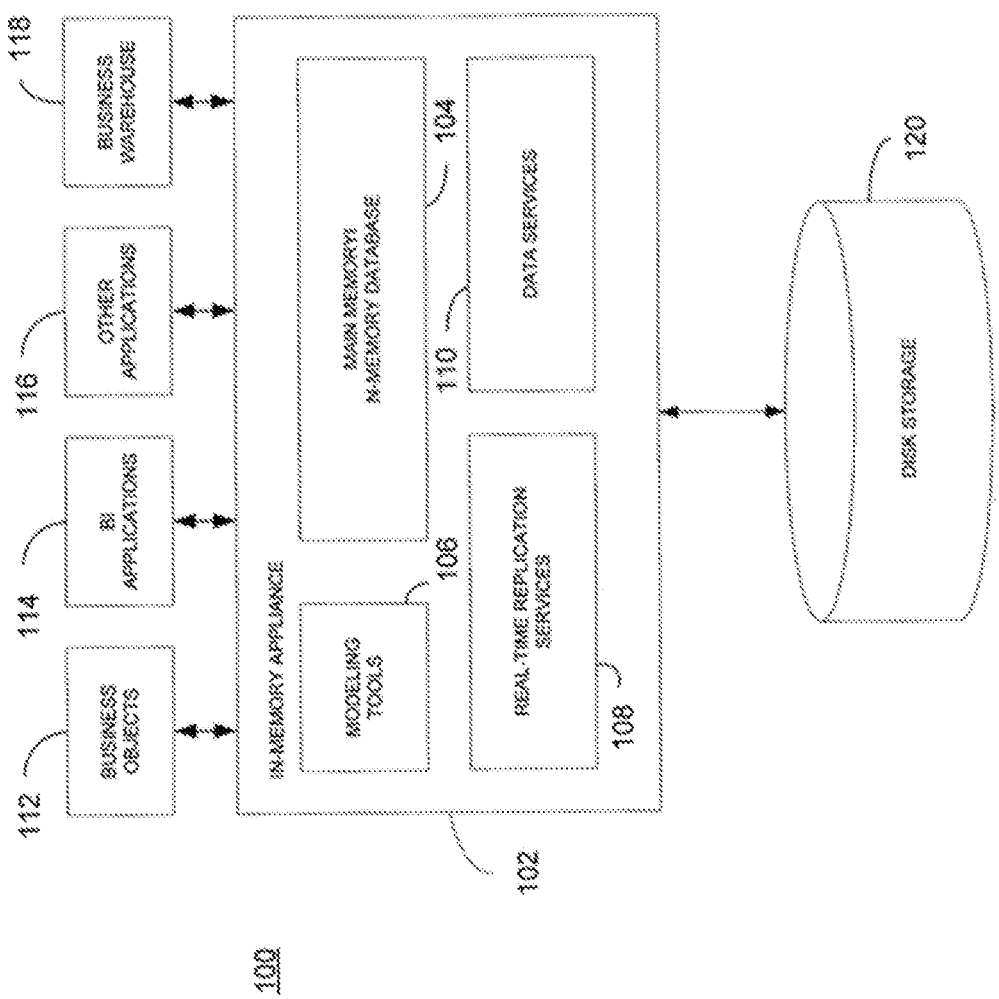
FIG. 1 is a diagram illustrating aspects of a system having one or more features consistent with implementations of the current subject matter.

Having data objects in the main memory of an in-memory database management system can be an efficient way of facilitating access of those objects by applications associated with the in-memory database. Having LOBs in the main memory requires loading all of the data into the main memory while accessing a table column, even if the LOB entry is never accessed. Furthermore, large objects (LOBs) can take a considerable amount of time and resources to load into the main memory. This can be particularly wasteful when the application rarely accesses that particular LOB. Consequently, LOBs having a certain size can be stored on disk memory instead of in the main memory. This can reduce the memory footprint of the in-memory database, even when a column is being loaded. Accessing these disk-stored LOBs may be more time consuming at the time of access, but overall, the in-memory database management system can perform its functions with increased efficiency.

When LOBs are stored on a disk, one file is used per LOB. A file can also be referred to in the industry as a set of pages (in some variations as a page chain). Consequently, LOBs can be stored on a page chain, where one page chain is used per LOB. In a disk management of a database the disk is split into pages, where each page has a fixed byte size. Only a limited amount of pages sizes are available, for example 4 KB, 16 KB, 64 KB, 256 KB, 1 MB, 4 MB and 16 MB which allows the database management to avoid disk fragmentation. Each file needs a unique physical location on the disk which is determined by the physical address of the start page of the page chain, therefore each file is assigned to at least one page, or set of pages. No other file will be assigned to that at least one page or set of pages. Where LOBs are large, the file size can occupy more than one page. Where LOB files are smaller than the minimal size of a page, those individual LOB files will still be assigned to individual pages. This can result in large amounts of wasted disk space.

For example, say a page size on a disk is 4000 bytes, a LOB of 1000 bytes is assigned its own page. No other LOB can be assigned to that page. Consequently, saving that LOB on the disk causes 3000 bytes of wasted disk space. While having one LOB having a file size less than a minimal page size may be inconsequential, this wasted space can be highly impactful when there are millions or hundreds of millions of LOBs having a size less than a minimal page size on the disk. A large percentage of the potentially usable space on a disk may go unused but may also cause operational costs, for example, by increasing the size of the database backup.

The minimal size of the page can be a fraction of the size of the page. The desired fraction of the size of the page can be selected by the database management system. The selection can be based on one or more factors in the management of the database by the database management system.

It may be inefficient to load into the main memory LOBs having a size less than a minimal page size on the disk. Doing so may be inefficient, especially if there are a large number of such LOBs or those LOBs are rarely accessed by applications using the in-memory database.

To address these and other issues with currently available solutions, methods, systems, articles of manufacture, and the like consistent with one or more implementations of the current subject matter can, among other possible advantages, provide for the storage of LOBs, having a size smaller than the minimal size of a disk page, on a disk, with less waste of disk space. A data structure is provided that facilitates the generation of a mid-size LOB container for storing mid-size LOBs. A mid-size LOB being LOB having a size less than the minimal size of a disk page, but greater than a size where it would make more sense to load the LOB into the main memory. As an example, in some database management systems, a mid-size LOB can be between about 1000 bytes and 4000 bytes, where a disk sector size is more than 4000 bytes. The minimal size of the disk page can be different for different database systems and different disk storage systems. The database management system can be configured to determine the minimal size of the disk page based on its individual operational parameters.

The mid-size LOB container can be configured to facilitate the storage of mid-size LOBs in a consecutive manner in a set of disk pages. The mid-size LOB container is able to store several mid-size LOBs in a single disk page and thus minimizing disk waste. Each LOB can have a unique identification code. In some variations, the unique identification code of an LOB can be mapped to a page identification code of the disk page in which the LOB is stored, and an off-set within the page indicating the start of the LOB data.

FIG. 1 is a block diagram of an in-memory database system (IMDS) 100 that includes an in-memory appliance 102 having a main memory database 104 having a column and/or row structure, for fast storage, access and retrieval of business data. In some variations, the main memory can be provided in silicon, such as random access memory. The main memory can be integrated with data processors in such a manner to make accessing data stored in the main memory quicker and more efficient. Accessing data in the main memory can eliminate seek time when querying the data compared to accessing data in a disk. One or more data processors typically access main memory through one or more memory busses.

In some variations, the in-memory appliance 102 of the IMDS 100 can include modeling tools 106 for modeling any number of applications or visualizations of the data from the main memory 104, i.e. executing various business applications or the like, real-time replication services 108 and data services 110 for the business data received for storage by the in-memory appliance 102.

The in-memory appliance 102 can be a computing system such as a server, or a set of computing system distributed across a network. The in-memory appliance 102 receives data for storage according to one or more business objects 112, which can be retrieved and used by one or more business intelligence (BI) applications 114 or other applications 116. Other consumers of business data from the in-memory appliance 102 can be a business warehouse 118 or similar application framework.

The IMDS 100 can include a disk storage 120 connected to the in-memory appliance 102. As previously discussed, in some implementations, it can be advantageous to store LOBs on the disk storage 120 rather than in the column and row structure of the main memory 104 in order to achieve further optimization of the IMDS 100.

In some in-memory database systems, a row/or and column store are available. Both can be used interchangeably for various scenarios. When switching from one store to another, the contained data may need to be copied and reorganized since different data layouts are used (row oriented vs. column oriented). For LOBs this might become very resource intensive, but storing LOBs on disk is independent of the different memory layouts required for row and/or column store. Accordingly, there need only be a pointer to the files and/or file locations containing LOB data.

Column store updates of rows can be realized by duplicating all the data of the affected rows—even if most of the data doesn't change (this is needed for fast search over all columns). Storing a new or updated row requires writing all this data into main memory as well as into a database log for recovery after database failures. Should LOBs be stored in column/row-based tables, performing column store updates of rows can be resource intensive, requiring more hardware, such as data processors and/or main memory, than would otherwise be necessary. Large data put into main memory may require larger database logs. In a disk-based approach, LOBs are stored just once, and can be referenced from column and/or row store—e.g. in case of an update, a given LOB might be referenced multiple times. Main memory consumption increases by the reference pointer to the file on disk, while the database log holds the data only once.

Since the column store supports partitioned tables that might be located on different hosts, different file storage (in HANA: persistency) can also be used to store the LOB files. If a row is moved from one table part to another, LOB data need not copied from one memory sector to another. The LOB data can remain in its original memory sector and merely be referenced from arbitrary hosts to any persistence in the landscape. Temporal tables (i.e., history tables) can be supported to contain LOB data. If a row is historicized and the LOB data does not change, e.g. by updates of some non-LOB fields, the very same LOB can be shared across the history part of a table and the most recent data part, without requiring multiple copies of the LOB.

In accordance with some implementations, storing data on disk may be preferable for document storage and text retrieval systems. Since some in-memory database systems provide a text retrieval system for fast document search and analysis, it will use the disk based LOB approach. The main data can then be stored separate from the searchable index structure held in main-memory for fast access. In case the original document is requested by an application, the file data is retrieved and a more expansive disk access process is performed.

Figure 2:
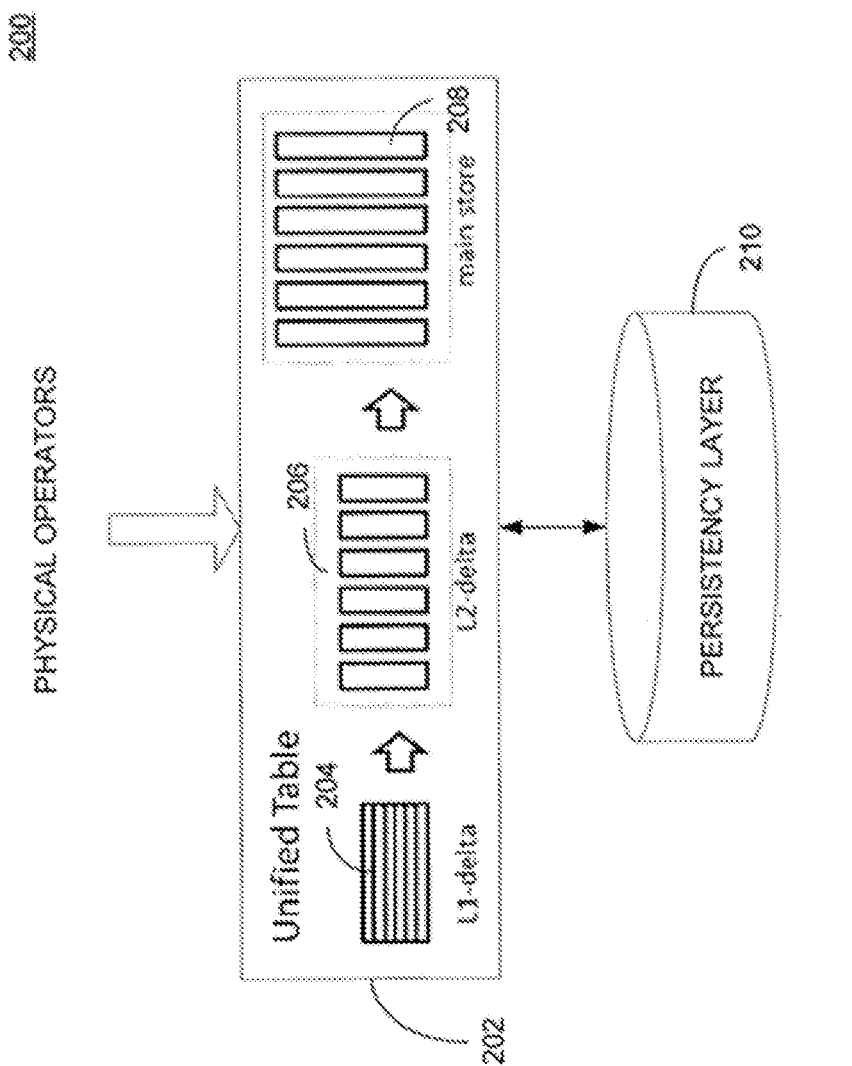
FIG. 2 is a illustrating aspects of a system showing features consistent with implementations of the current subject matter.

FIG. 2 illustrates a storage structure 200 that can be used with an in-memory database according to implementations of an LOB storage scheme. The storage structure includes a unified table structure 202 having a row store structures 204 for storing, as an example, level 1 delta data based on operations executed according to a number of physical operators. The unified table structure 202 can include column store structures 206 and 208, for storing level 2 data and main memory storage, respectively. The row 204 and column 206/208 store structures can store most of the business data used in any given application, however in accordance with some implementations, large object (LOB) business data can be selectively stored in a disk persistency layer 210.

The persistency that stores LOBs can be transactional, and the creation of LOB can also be transactional-based. LOB deletion functions can be accomplished by an asynchronous job. While using a column store technique for main memory, the storage structure supports split tables and temporal tables (i.e., history tables). Disk storage, however, can support distributed landscapes, so LOB data can be stored in a different persistency than where the table belongs without significant loss of functionality.

The in-memory database system's disk layer can be transactional aware, i.e., creating, updating and removing files can be realized as atomic operations and can be rolled back in the case of errors. Disk-based LOBs can make use of atomicity in two ways.

The disk-based LOB can make use of atomicity by tracking multiple references pointing to one LOB file, so-called reference-counting can be used, and the file can be stored along with a small integer counter on disk. Each new in-memory reference increases the counter by one. The LOB file is dropped if its reference count equals zero during its transaction commit. This can happen, for example, during drop table/column operations and delta merge operation in the column store.

The second way the disk-based LOB can make use of atomicity is, in addition to the reference counter, information about which tables/column own a LOB file is stored with each LOB file. These "owner" identifiers (IDs) or references (OwnerIDs) are composed of a TableID and an AttributeID (column id). Each LOB file might have multiple OwnerIDs attached to it depending on the number of times it was inserted into some column. Storing the owners together with the LOB files provides an efficient garbage-collecting mechanism to remove orphaned LOB files just by scanning all LOB directories of the landscape and removing files that have no OwnerId. Additionally, drop table/column operations in distributed systems can be implemented very efficiently by using this technique.

Figure 3:
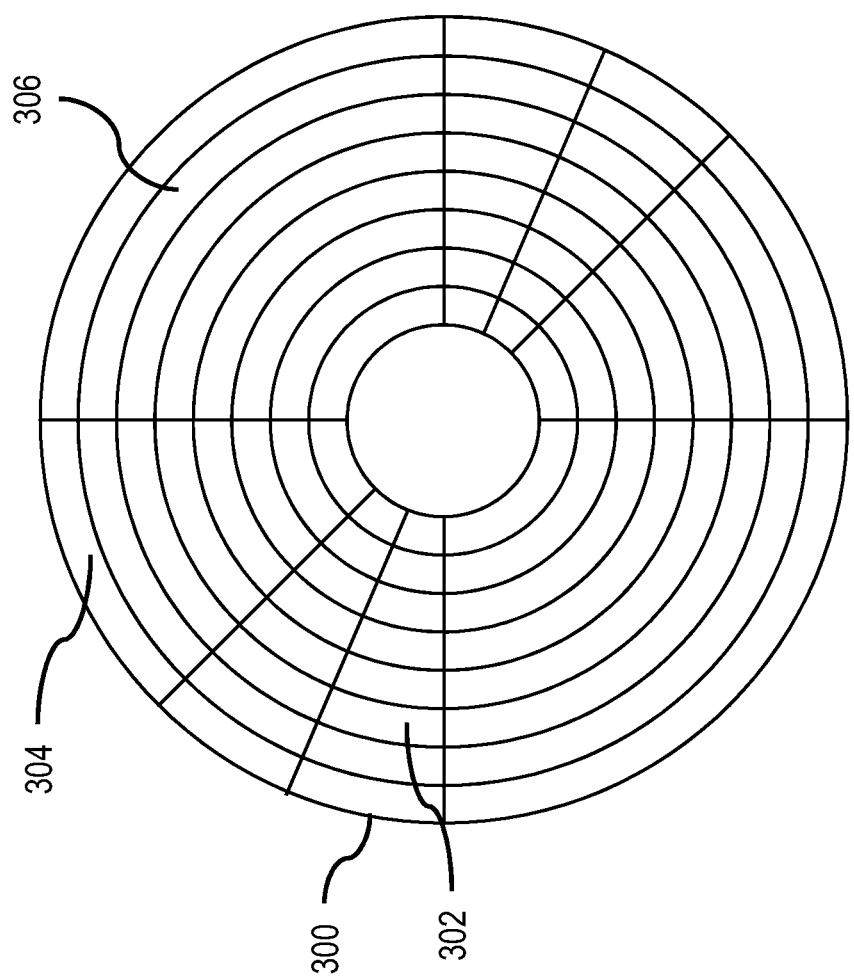
FIG. 3 is a block illustration of a surface of a disk storage.

FIG. 3 is a block illustration of a surface of a disk storage 300 as it is organized by a database management system. A disk storage 300 is typically subdivided into pages 302. A page 302 is the storage unit of disk storage 300 within the database. The pages within disk storage typically have a common size. Several page sizes are usually supported to accommodate for different file sizes. In some variations, pages might have a 4 KiB size (302), 16 KiB (304), 256 KiB (306) and so on. Each page 302, 304, 306 has a page identifier, which provides an indication of the location of the page 302, 304, 306. Each file stored on the disk storage 300 is given its own unique page depending on its size 302, 304, 306 and, if a single page is not sufficient, a set of pages. Consequently, when a file is less than a pages size of a page 302 there is wasted space. For example, if a file occupies 30 bytes of data, and the page size of a page 302 is 4096 bytes, it means that there will be 4069 bytes of unused storage space, which cannot typically be used by other files.

In in-memory database management systems, there can be a large number of objects that would ideally be stored on disk storage 300 instead of being loaded into the main memory. Where there are multiple objects having a size less than the size of a page 302 in disk storage there can be a great deal of wasted storage space on the disk storage 300.

Figure 4:
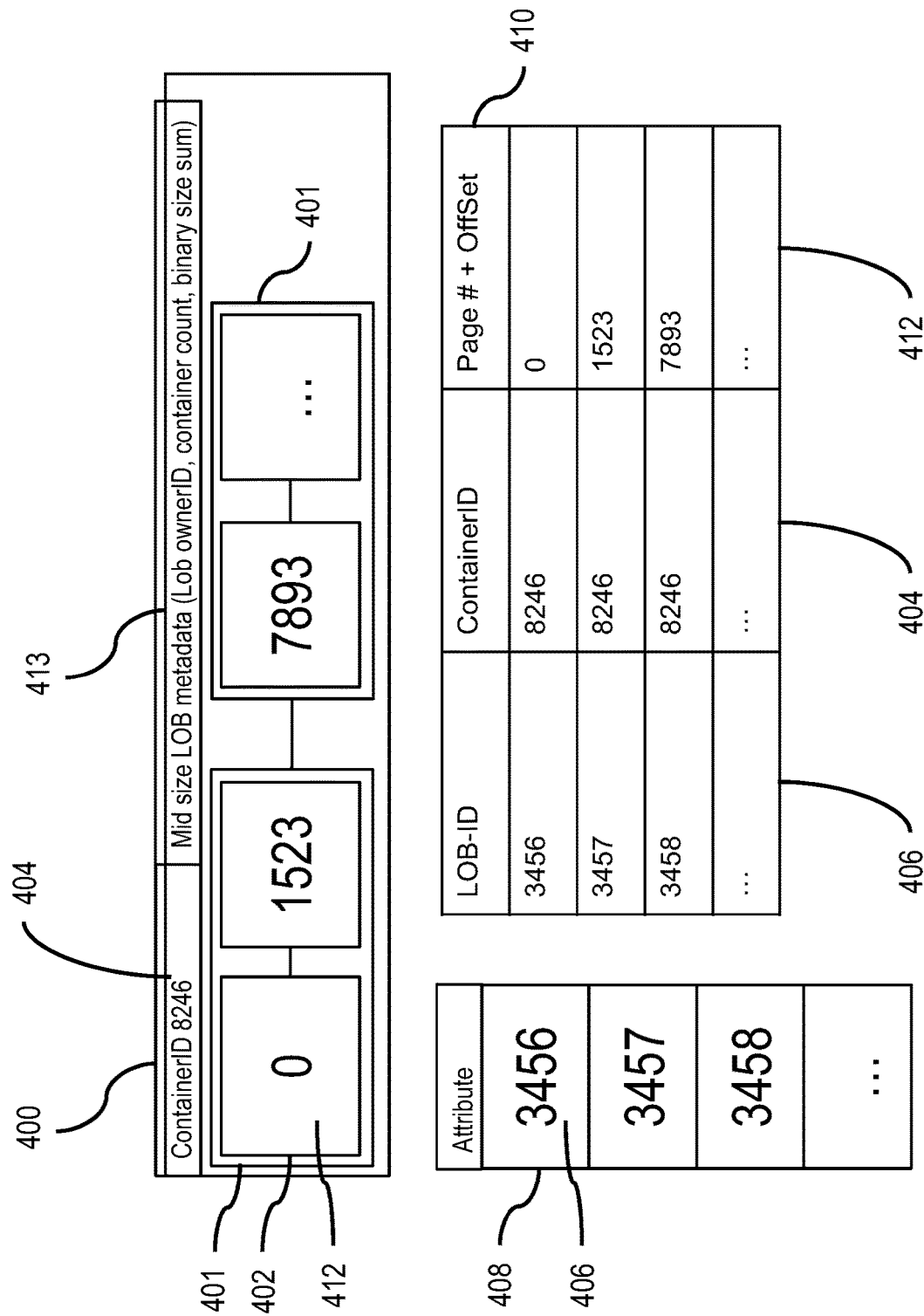
FIG. 4 is an illustration of a LOB container having one or more elements consistent with the present description.

FIG. 4 is an illustration of a LOB container 400 having one or more elements consistent with the present description. In some variations, LOB data meeting certain criteria can be stored in a LOB container 400, as LOB files 402 on a disk page 401 of the LOB container, in a persistency of a disk storage. An LOB container 400 can be configured to store multiple LOB files 402 on a set of pages 401 where several LOB files can fit on one disk page. A LOB container 400 can have a size criteria. The size criteria can dictate the range of sizes of LOB files 402 associated with LOB data that can be included in the LOB container 400. The LOB container 400 can be configured to be stored in a persistency of a disk storage, such as disk storage 300 illustrated in FIG. 3.

The size criteria of the LOB container 400 can be a function of the page size of the disk storage, the minimal size of the disk pages of the disk storage, or the like. For example, the page size of page 302 in disk storage 300. The size criteria of the LOB container 400 can dictate that LOB data having a size less than the minimal page size of the pages of the disk storage can be stored in the LOB container 400. For example, the LOB container 400 can have a size criteria dictating that LOB data having a size less than 4 KiB, where the page size of the disk storage is 4 KiB, can be stored in the LOB container 400.

The size criteria of the LOB container 400 may have a lower LOB size limit. The lower LOB size limit may be a function of the efficiency with which LOBs of a certain size are managed by the in-memory database system when the LOBs are stored in the main memory versus when the LOBs are stored in the disk storage. This determination can take into account the time it takes for the database management system to load the LOBs into main memory vs. the time it takes for the database management system to access the LOBs in the disk storage when needed by an application of the database management system. In some variations, the lower LOB size limit of an LOB container can be equal to, or less than, 1000 bytes.

Where a single page 302 is not sufficient to store the LOBs on disk, LOB files can be stored as a sequence of pages on disk. An upper size criteria can be used to when determining whether to store LOBs as a sequence of pages in an individual LOB files. Even though there might be page sizes 304, 306 available which are large enough to store the LOB, it might be more optimal with respect to waste of persistent disk space to use a separate file with a sequence of pages instead of a large page 304, 306.

The system 100 can be configured to determine the optimum format for optimizing usage of disk storage 120 when storing LOBs. The system 100 can be configured to base the determination of the optimum format for storing LOBs based on the size of the set of LOBs to be stored, the available sector sizes of the disk storage 120, the access frequency of the set LOBs, and/or other factors.

Other factors used to determine whether LOB data is stored in an LOB container can include, for example, attribute criteria. Attribute criteria of the LOB container 400 can dictate the attributes required of LOB data before it can be saved in the LOB container 400. Attributes can include: a data type of the LOB data, for example, a common file extension; an application associated with the LOB data; a condition of the LOB data, such as whether the LOB data is encrypted, corrupted, or the like; a subject of the LOB data; or the like.

A LOB container 400 can efficiently store data which is common to all LOB 402. For example, the LOB container 400 can efficiently store the LOB ownerID, metadata of the LOB 402 contained in container 400, or the like. An exemplary example of the metadata 413 stored in the LOB container 400 can be the sum of binary sizes of all LOB 402 belonging to the LOB container 400 or the count of LOBs 402 stored in the LOB container 400. The metadata can facilitate the efficient retrieval of monitoring information without the need to iterate all LOBs 402 of the LOB container 400.

Attribute criteria of the LOB container 400 can include a historical access frequency of the LOB data. For example, the historical access frequency of a particular LOB data can include an indication that the LOB data is rarely accessed by the in-memory database management system. Consequently, the LOB data may be preferably stored on disk storage rather than on the main memory. Conversely, the historical access frequency of a particular LOB data can include an indication that the LOB data is frequently accessed by the in-memory database management system. Consequently, the LOB data may be preferably stored in the main memory to facilitate efficient access of the memory by the database management system.

In some variations, LOB data 402 can be assigned to an LOB container 400 in response to a determination that (1) the LOB data 402 meets the size criteria of the LOB container 400, and (2) that the historical access frequency of the LOB data 402, by the database management system, is less than a threshold frequency.

LOBs can be assigned to a particular LOB container based on lower LOB size and upper LOB size criteria. These two thresholds can be system parameters which can be adjusted by the operator of the database management system, such as system 100.

The LOB container 400 can have an associated LOB container ID 404. The LOB data 402 can have an associated LOB ID 406. The main memory of the database management system can keep a record of the LOB ID 406 instead of the entire LOB data 402. For example, a column 408 can be maintained in the main memory of the database management system. The column 408 can include the LOB ID 406.

A mapping table 410 can include a record of the LOB ID 406, the LOB Container ID 404 of the LOB Container that the LOB data 402 is stored in, and a page number plus offset 412. The offset 412 can include an indication of the start and finish of the requested LOB. In some variations, the database management system can read the start position of the requested LOB and the start position of the next LOB within the LOB container to determine which data to retrieve from the LOB container. The offset 412 can be represented as a page number of the LOB container 400 plus a number of bytes from the beginning of the page at which the LOB data resides. The mapping table 410 can be part of the database management system 102 and stored on disk 120 in order to be restored upon restart of the database system 102 to assure durability of the mapping. In some variations, to increase performance, the mapping can be loaded into memory for fast access.

When in use, as an example, an application associated with the database management system may request access to a particular LOB. That LOB can be an LOB stored on the disk storage, rather than in the main memory. The main memory can include an indication of which LOB container the requested LOB resides, for example the LOB Container ID 404, and an offset 412 within that container of where the LOB data, associated with the requested LOB, starts. The disk storage can include a data map providing the physical location, or the identity of the page, of the LOB container 400. The disk storage can be configured to retrieve the data that is located at a specified offset within the identified page.

In accordance with some implementations, LOB data is referenced by a GlobalContainerId consisting of a VolumeId of persistency and an Id of the LOB container. The VolumeID specifies the persistency where the file is stored, while the Id references the LOB object inside the persistency. The LOB object can be either a file consisting of a chain of pages or the LOB object can be stored as part of a LOB container which can be configured to store multiple LOBs in a single page. A LOB file consisting of a chain of pages is referenced by a ContainerID and a LOB 402 as part of a LOB container 400 is referenced by a LOB-ID. ContainerID and LOB-ID can be distinguished by a single status bit indicating if the current ID is a ContainerID or a LOB-ID. In case the Id of a LOB is of type LOB-ID, the LOB-ID mapping 400 is queried in order to retrieve the LOB containerID 404 and the offset 412 indicating the location of a particular LOB within the page 401 associated with the LOB container 400. In case the Id is of type ContainerID, an individual LOB container spanning several pages has to be retrieved from disk using standard techniques of the database management system 102. The GlobalContainerID is stored in main memory, i.e. inside the row or column structures of main memory, instead of the raw data. This means LOB data itself is not touched for row updates or table movements across different hosts. To document these changes the GlobalContainerID, rather than plain data, is stored in the database log.

This structure allows operations of selects/updates containing LOB data to be handled efficiently. Whenever possible, only the GlobalContainerId is accessed, such that the associated data is not duplicated or held in main memory. There is no need to access and transmit the whole data. Until the data is actually needed to be accessed, it is sufficient to pass around GlobalContainerIDs. For accessing LOB data a common file interface can be provided to stream read and write operations. Only the GlobalContainerId is copied inside main memory structures, and can be referenced multiple times.

In addition to "create" functions, the functions of updates and drops of LOB files use transactional visibility, including rollback in case of errors. These objects are shared across multiple tables/columns in the row and column store, but need multiple owner extension in disk storage. In some implementations, a mixed usage of in-memory and on disk storage is used for single columns. For example, small LOBs may be stored in-memory or in a special section of the disk or persistency. Larger LOBs of the same column can always stored on disk, as separate files (set of disk pages). Midsize LOBs that meet LOB container criteria can be stored in LOB containers which are stored in a persistency on disk storage. In some variations, midsize LOBs are LOBs having a size greater than small LOBs but less than large LOBs.

For some scenarios it is difficult to determine whether to store data directly on disk, in a LOB container on disk, or in main memory. This determination mainly depends on the data size and its access patterns. Accordingly, a mixed column approach can be implemented, where small data (some 100 Bytes) is still held in-memory, without a file on the disk being created, and larger data above this limit is kept on disk, directly or in an LOB container, as described above. For the User/Application this can be fully transparent. The User/Application may be unaware of whether the LOB is in main memory or on a disk. Advantages include fast access for small data, since it is held directly in main memory. Smaller data can easily be searched without round trips to the persistency that needs expensive file open, scan and close operations. Such techniques also reduce main memory consumption for LOBs above a predetermined threshold, which are to be stored on disk. In this latter case, an overhead for file access is acceptable since expensive main memory is not used. Where infrequently accessed LOBs meeting certain size criteria are stored in LOB containers, disk storage waste is greatly reduced.

Having medium-sized LOBs in LOB containers stored on disk can facilitate restoration of the data contained therein during recovery after a database system failure. After recovery, the LOB container may be located in a different page on the disk storage or on a different disk storage. Consequently, the individual LOB files 402 might be located at different pages and have different offsets. However, the LOB container ID remains the same. The LOB-ID mapping 410 will be restored during recovery such that the LOB-ID mapping is pointing to the new page and offset after the recovery. Therefore, all data structures, for example the Attribute 408 storing the LOB-ID 406 as part of the GlobalContainerID, remain stable. Thus after a crash recovery the GlobalContainerID is still valid and will be the same as before the recovery.

Figure 5:
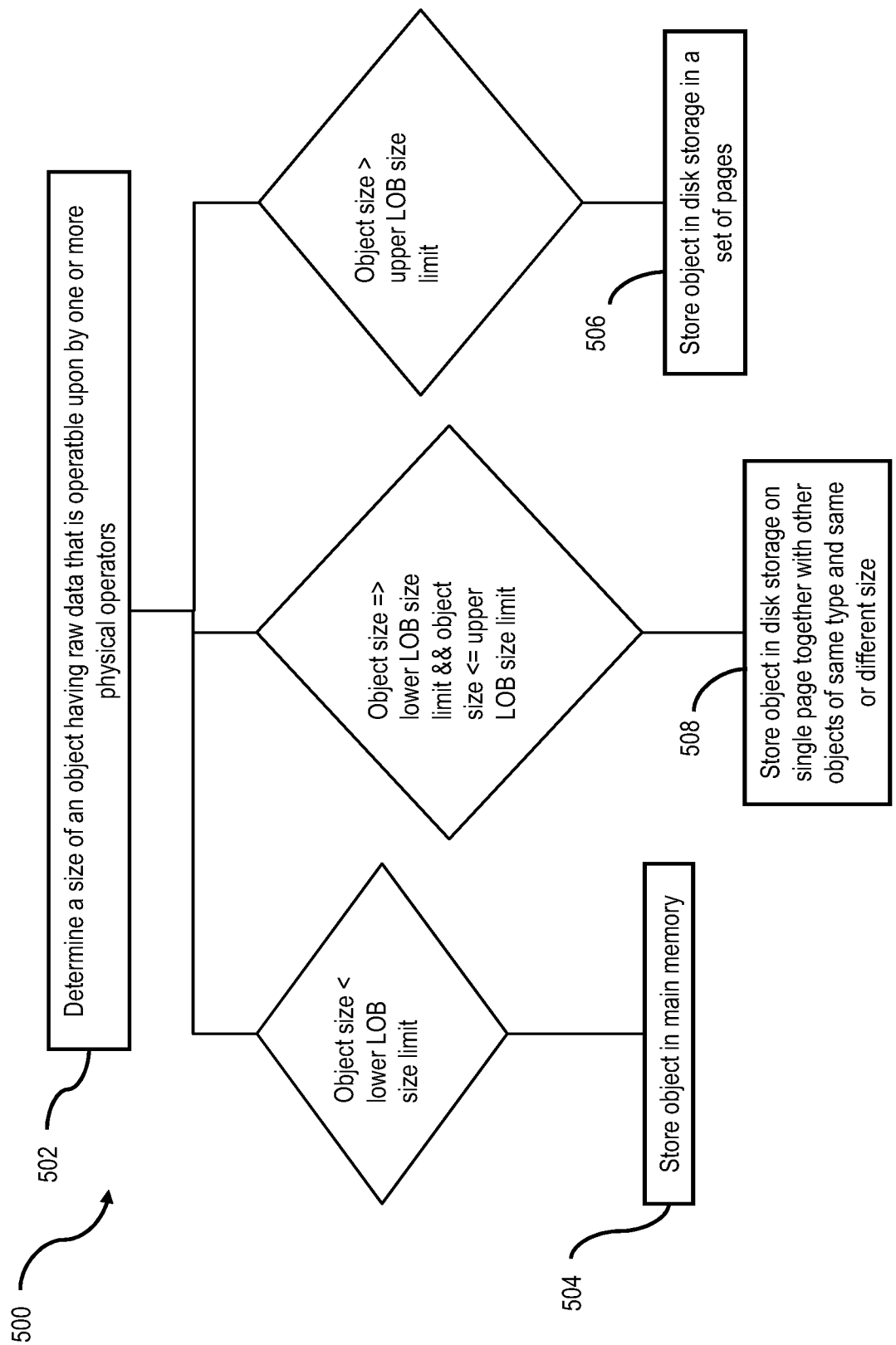
FIG. 5 is a flowchart of a method for storing LOBs in a database management system having one or more features consistent with the present description; and, FIG. 6 illustrates a distributed landscape with two hosts running various LOB storage methods having one or more features of the present description. When practical, similar reference numbers denote similar structures, features, or elements.

FIG. 5 is a flowchart of a method 500 for storing LOBs in a database management system having one or more features consistent with the present description. The steps of method 500 illustrated in FIG. 5 are exemplary only. Two or more steps may be combined into a single step. A single step may be performed in one or more stages.

At 502, a size of an object is determined. The object can include raw data that is operable upon by one or more physical operators.

At 504, in response to a determination that the object size is less than the lower object container size criteria, the object can be stored in the main memory of the database management system.

At 506, in response to determining that the object size exceeds an upper object container size criteria, the object can be stored in disk storage as a an object spanning multiple disk pages. In some variations, the object may not span the last disk page fully.

At 508, in response to a determining, by the database management system, that the object size meets an object container size criteria, the object can be stored in an object container. The object container can include other LOBs of same type. The container including LOBs of a particular type can be assigned to a set of disk pages. The set of disk pages can include one disk page. The set of disk pages can include a plurality of disk pages. Assigning LOBs that meet an object container size criteria to an object container can reduce the amount of waste of disk space.

The disk storage can be separated into pages. In some variations, the size criteria of the object container can be a function of the page size.

The object can have an identification assigned to it. The identification of the object can be stored in the main memory facilitating access to the object by the database management system without having to load the object into the main memory. The identification can carry the information indicating the storage type of the object, for example, whether the storage type is in memory object, on disk object single page, on disk object set of pages.

Figure 6:
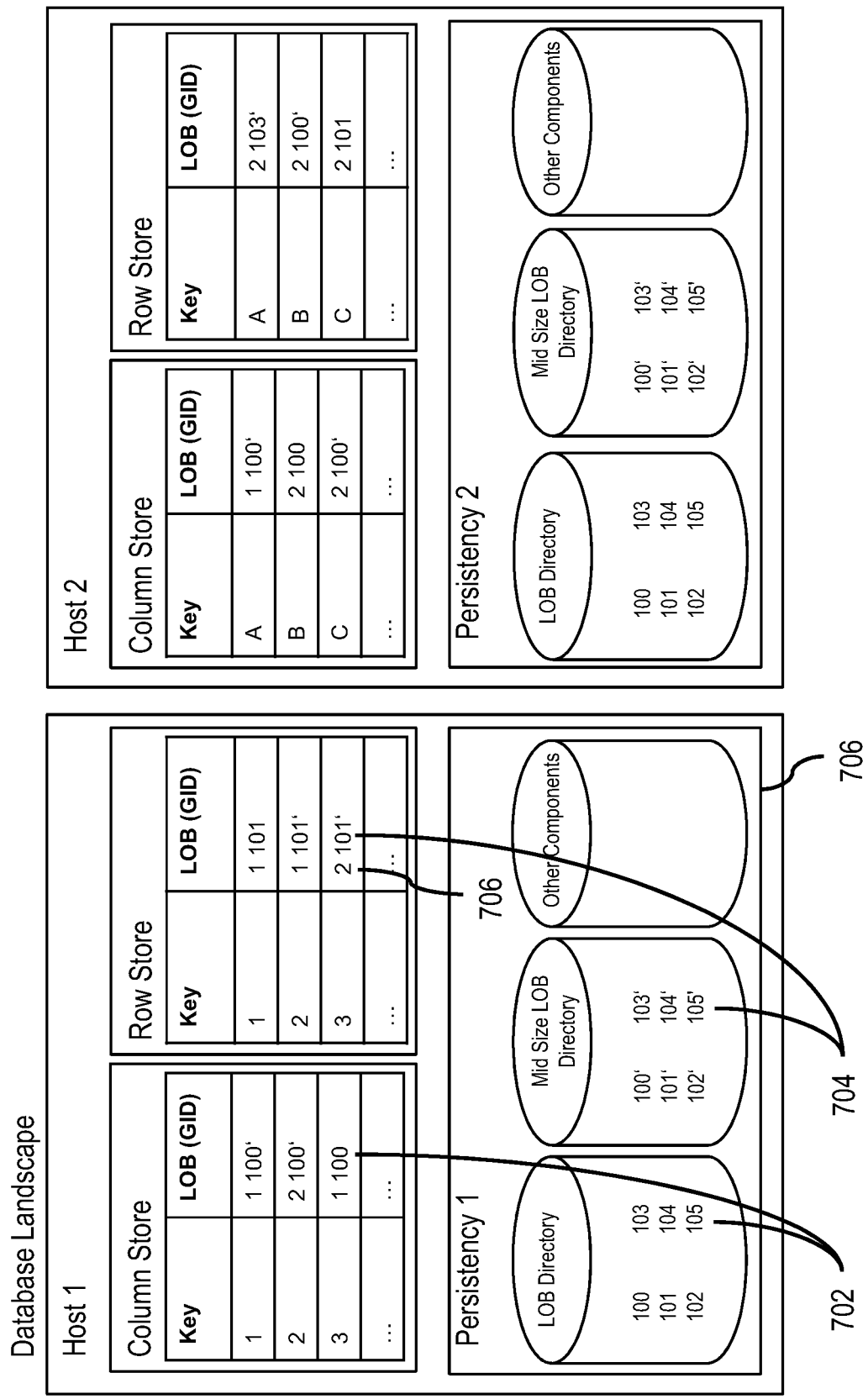

FIG. 6 illustrates a distributed landscape with two hosts running various LOB storage methods. Both hosts include a column store and row store, as well as a persistency, which includes a disk storage. Each persistency includes a dedicated LOB directory to store LOB data and a dedicated Mid Size LOB directory to store LOBs of medium size. Those of skill in the art would recognize that there are many other components of an in-memory database system that are not shown in FIG. 6.

In the example shown in FIG. 6, there are two different tables each per host and store. The LOB columns hold only the references (GlobalContainerID) and not the data. In the GlobalContainerID the data is represented by its VolumneID (=number of persistency) 706 and its local ContainerID 702 or local LOB-ID 704 in case of Mid Size LOBs. The LOB-ID 704 is processed by the Mid Size LOB directory of the respective persistency as shown in FIG. 4. The LOB-ID is transferred via LOB file mapping 410 into a physical position 404 and offset 412 and thus the data is stored or received at the appropriate page of the disk 300, as shown in FIG. 3.

As can be seen, column and row store tables can reference LOB files from any persistency in the landscape. Also the same GlobalContainerID (GID) can be referenced more than once. Row store table on host 2 references file with GID=2 100'. In the given example, an update of the key-column could have caused this situation. Also the same file is referenced by a column table on host 1. This is caused by an insert with a select statement where column table on host 2 was selected and filtered by key=B. Accordingly, storing LOB data to disk and not to main memory will improve overall performance and access speed of an in-memory database system.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method, comprising:

determining, by an in memory database system, a first size of a first object, a second size of a second object, and a third size of a third object, the first object, the second object, and the third object each having data that is operable upon by one or more query operators;

determining that the first size of the first object is greater than a first threshold size criteria, that the first size of the first object is less than a second threshold size criteria, and that a first access frequency of the first object is less than a threshold access frequency criteria;

in response to determining that the first size of the first object is greater than the first threshold size criteria, that the first size of the first object is less than the second threshold size criteria, and that the first access frequency of the first object is less than the threshold access frequency criteria, storing, by the in memory database system, the first object to an object container in a disk storage coupled to the in memory database system;

determining that the second size of the second object is greater than the first threshold size criteria, that the second size of the second object is less than the second threshold size criteria, and that a second access frequency of the second object is greater than the threshold access frequency criteria;

in response to determining that the second size of the second object is greater than the first threshold size criteria, that the second size of the second object is less than the second threshold size criteria, and that the second access frequency of the second object is greater than the threshold access frequency criteria, storing, by the in memory database system, the second object to an in memory storage of the in memory database system;

in response to the storing of the first object to the object container in the disk storage coupled to the in memory database system, generating, by the in memory database system, a first object identifier to identify the first object, wherein the first object identifier is mapped to a container identifier that identifies the object container at the disk storage and is further mapped to a first offset that indicates where in the object container the first object begins;

storing, to the in memory storage of the in memory database system, the first object identifier mapped to the container identifier and the first offset;

in response to the storing of the second object to the in memory storage of the in memory database system, generating, by the in memory database system, a second object identifier to identify the second object, wherein the second object identifier is mapped to the in memory storage of the in memory database system where the second object is stored;

storing, to the in memory storage of the in memory database system, the second object identifier mapped to the in memory storage of the in memory database system where the second object is stored;

determining that the third size of the third object is less than the first threshold size criteria;

in response to determining that the third size of the third object is less than the first threshold size criteria, storing the third object to the in memory storage of the in memory database system;

in response to storing the third object to the in memory storage of the in memory database system, generating, by the in memory database system, a third object identifier to identify the third object, wherein the third object identifier is mapped to the in memory storage of the in memory database system where the third object is stored;

storing, to the in memory storage of the in memory database system, the third object identifier mapped to the in memory storage of the in memory database system where the third object is stored; and accessing, by the in memory database system, the first object based on the stored first object identifier, the second object based on the stored second object identifier, or the third object based on the stored third object identifier.

2. The method of claim 1, wherein the object container further includes metadata, the metadata comprising a sum of sizes of objects stored in the object container and a count of objects stored in the object container, and wherein the method further comprises:

determining that a fourth size of a fourth object is greater than the second threshold size criteria; and in response to determining that the fourth size of the fourth object is greater than the second threshold size criteria, storing, by the in memory database system, the fourth object to the object container in the disk storage coupled to the in memory database system.

3. A system, comprising:

a processor; and a memory storing machine-readable instructions, which when executed by the processor, cause the processor to perform one or more operations, the operations comprising:

determining, by an in memory database system, a first size of a first object, a second size of a second object, and a third size of a third object, the first object, the second object, and the third object each having data that is operable upon by one or more query operators;

determining that the first size of the first object is greater than a first threshold size criteria, that the first size of the first object is less than a second threshold size criteria, and that a first access frequency of the first object is less than a threshold access frequency criteria;

in response to determining that the first size of the first object is greater than the first threshold size criteria, that the first size of the first object is less than the second threshold size criteria, and that the first access frequency of the first object is less than the threshold access frequency criteria, storing, by the in memory database system, the first object to an object container in a disk storage coupled to the in memory database system;

determining that the second size of the second object is greater than the first threshold size criteria, that the second size of the second object is less than the second threshold size criteria, and that a second access frequency of the second object is greater than the threshold access frequency criteria;

in response to determining that the second size of the second object is greater than the first threshold size criteria, that the second size of the second object is less than the second threshold size criteria, and that the second access frequency of the second object is greater than the threshold access frequency criteria, storing, by the in memory database system, the second object to an in memory storage of the in memory database system;

in response to the storing of the first object to the object container in the disk storage coupled to the in memory database system, generating, by the in memory database system, a first object identifier to identify the first object, wherein the first object identifier is mapped to a container identifier that identifies the object container at the disk storage and is further mapped to a first offset that indicates where in the object container the first object begins;

storing, to the in memory storage of the in memory database system, the first object identifier mapped to the container identifier and the first offset;

in response to the storing of the second object to the in memory storage of the in memory database system, generating, by the in memory database system, a second object identifier to identify the second object, wherein the second object identifier is mapped to the in memory storage of the in memory database system where the second object is stored;

storing, to the in memory storage of the in memory database system, the second object identifier mapped to the in memory storage of the in memory database system where the second object is stored;

determining that the third size of the third object is less than the first threshold size criteria;

in response to determining that the third size of the third object is less than the first threshold size criteria, storing the third object to the in memory storage of the in memory database system;

in response to storing the third object to the in memory storage of the in memory database system, generating, by the in memory database system, a third object identifier to identify the third object, wherein the third object identifier is mapped to the in memory storage of the in memory database system where the third object is stored;

storing, to the in memory storage of the in memory database system, the third object identifier mapped to the in memory storage of the in memory database system where the third object is stored; and accessing, by the in memory database system, the first object based on the stored first object identifier, the second object based on the stored second object identifier, or the third object based on the stored third object identifier.

4. The system of claim 3, wherein the object container further includes metadata, the metadata comprising a sum of sizes of objects stored in the object container and a count of objects stored in the object container, and wherein the operations further comprise:

determining that a fourth size of a fourth object is greater than the second threshold size criteria; and in response to determining that the fourth size of the fourth object is greater than the second threshold size criteria, storing, by the in memory database system, the fourth object to the object container in the disk storage coupled to the in memory database system.

5. A non-transitory computer-readable medium storing instructions, which when executed by at least one data processor, result in operations comprising:

determining, by an in memory database system, a first size of a first object, a second size of a second object, and a third size of a third object, the first object, the second object, and the third object each having data that is operable upon by one or more query operators;

determining that the first size of the first object is greater than a first threshold size criteria, that the first size of the first object is less than a second threshold size criteria, and that a first access frequency of the first object is less than a threshold access frequency criteria;

in response to determining that the first size of the first object is greater than the first threshold size criteria, that the first size of the first object is less than the second threshold size criteria, and that the first access frequency of the first object is less than the threshold access frequency criteria, storing, by the in memory database system, the first object to an object container in a disk storage coupled to the in memory database system;

determining that the second size of the second object is greater than the first threshold size criteria, that the second size of the second object is less than the second threshold size criteria, and that a second access frequency of the second object is greater than the threshold access frequency criteria;

in response to determining that the second size of the second object is greater than the first threshold size criteria, that the second size of the second object is less than the second threshold size criteria, and that the second access frequency of the second object is greater than the threshold access frequency criteria, storing, by the in memory database system, the second object to an in memory storage of the in memory database system;

in response to the storing of the first object to the object container in the disk storage coupled to the in memory database system, generating, by the in memory database system, a first object identifier to identify the first object, wherein the first object identifier is mapped to a container identifier that identifies the object container at the disk storage and is further mapped to a first offset that indicates where in the object container the first object begins;

storing, to the in memory storage of the in memory database system, the first object identifier mapped to the container identifier and the first offset;

in response to the storing of the second object to the in memory storage of the in memory database system, generating, by the in memory database system, a second object identifier to identify the second object, wherein the second object identifier is mapped to the in memory storage of the in memory database system where the second object is stored;

storing, to the in memory storage of the in memory database system, the second object identifier mapped to the in memory storage of the in memory database system where the second object is stored;

determining that the third size of the third object is less than the first threshold size criteria;

in response to determining that the third size of the third object is less than the first threshold size criteria, storing the third object to the in memory storage of the in memory database system;

in response to storing the third object to the in memory storage of the in memory database system, generating, by the in memory database system, a third object identifier to identify the third object, wherein the third object identifier is mapped to the in memory storage of the in memory database system where the third object is stored;

storing, to the in memory storage of the in memory database system, the third object identifier mapped to the in memory storage of the in memory database system where the third object is stored; and accessing, by the in memory database system, the first object based on the stored first object identifier, the second object based on the stored second object identifier, or the third object based on the stored third object identifier.

6. The method of claim 1, wherein the first threshold size criteria is determined based at least on a first time required to load an object into a main memory of the in memory database system relative to a second time required to access the object in the disk storage.

* * * * *